US007191058B2

(12) United States Patent
Laird et al.

(10) Patent No.: US 7,191,058 B2
(45) Date of Patent: *Mar. 13, 2007

(54) NOTIFICATION SYSTEMS AND METHODS ENABLING USER ENTRY OF NOTIFICATION TRIGGER INFORMATION BASED UPON MONITORED MOBILE VEHICLE LOCATION

(75) Inventors: David Laird, Fort Walton Beach, FL (US); Martin Kelly Jones, Delray Beach, FL (US)

(73) Assignee: Melvino Technologies, Limited, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 10/656,522

(22) Filed: Sep. 5, 2003

(65) Prior Publication Data

US 2004/0044467 A1    Mar. 4, 2004

Related U.S. Application Data

(63) Continuation of application No. 09/558,508, filed on Apr. 26, 2000, now Pat. No. 6,618,668, which is a continuation-in-part of application No. 08/852,119, filed on May 6, 1997, now Pat. No. 6,748,318, which is a continuation of application No. 08/434,049, filed on May 2, 1995, now Pat. No. 5,623,260, which is a continuation of application No. 08/432,898, filed on May 2, 1995, now Pat. No. 5,657,010, which is a continuation of application No. 08/432,666, filed on May 2, 1995, which is a continuation-in-part of application No. 08/407,319, filed on Mar. 20, 1995, now abandoned, which is a continuation-in-part of application No. 08/063,533, filed on May 18, 1993, now Pat. No. 5,400,020.

(60) Provisional application No. 60/039,049, filed on Mar. 10, 1997.

(51) Int. Cl.
*G01C 21/00* (2006.01)

(52) U.S. Cl. ................ 701/204; 701/200; 701/201; 701/207; 340/989; 340/995.1; 455/456.2

(58) Field of Classification Search ........ 701/200–202, 701/207–211, 117; 340/988–990, 995.1, 340/995.11, 995.13, 995.15; 455/457, 456.1, 455/456.2, 456.6; 342/357.01, 357.06
See application file for complete search history.

(56) References Cited

U.S. PATENT DOCUMENTS 3,568,161 A    3/1971    Knickel ..................... 340/994

(Continued)

FOREIGN PATENT DOCUMENTS

EP    0219859 A2    4/1987

OTHER PUBLICATIONS

"Public Transporation Information and Management Ssytems", IEE Colloquium, Computing and Control Division, May 25, 1993, pp. 9/1-9/4, 12/1-12/2, 7/1-7/3.

(Continued)

*Primary Examiner*—Gertrude A. Jeanglaude
(74) *Attorney, Agent, or Firm*—Thomas, Kayden, Horstemeyer & Risley, LLP

(57) ABSTRACT

A vehicle monitoring and notification system includes a mapping application and a data manager. The mapping application receives data identifying a particular location and automatically translates this data into a set of location values. The mapping application then stores the foregoing set of location values. The data manager retrieves the stored set of location values and monitors travel of a vehicle based on location values produced by a location sensor coupled to the vehicle. The data manager compares a set of location values produced by the sensor to the stored set of location values to determine when the vehicle is within a predefined proximity of the particular location. When the data manager determines that the vehicle is within the predefined proximity of the particular location, the data manager causes a notification message to be transmitted to a user communications device to notify a user of an impending arrival of the vehicle at the particular location.

20 Claims, 6 Drawing Sheets

U.S. PATENT DOCUMENTS

| | | | |
|---|---|---|---|
| 3,644,883 A | 2/1972 | Borman et al. | 340/23 |
| 3,845,289 A | 10/1974 | French | 235/151.2 |
| 3,886,515 A | 5/1975 | Cottin et al. | 340/994 |
| 3,934,125 A | 1/1976 | Macano | 235/150.2 |
| 4,220,946 A | 9/1980 | Henriot | 340/23 |
| 4,297,672 A | 10/1981 | Fruchey et al. | 340/23 |
| 4,325,057 A | 4/1982 | Bishop | 340/539 |
| 4,350,969 A | 9/1982 | Greer | 340/23 |
| 4,525,601 A | 6/1985 | Barnich et al. | 379/7 MM |
| 4,585,904 A | 4/1986 | Mincone et al. | 179/7.1 TP |
| 4,713,661 A | 12/1987 | Boone et al. | 340/994 |
| 4,791,571 A | 12/1988 | Takahashi et al. | 364/436 |
| 4,799,162 A | 1/1989 | Shinkawa et al. | 364/436 |
| 4,804,837 A | 2/1989 | Farley | 250/251 |
| 4,812,843 A | 3/1989 | Champion, III et al. | 340/905 |
| 4,813,065 A | 3/1989 | Segala | 379/112 |
| 4,857,925 A | 8/1989 | Brubaker | 340/994 |
| 4,894,649 A | 1/1990 | Davis | 340/825.44 |
| 4,956,777 A | 9/1990 | Cearley et al. | 364/424.02 |
| 5,003,584 A | 3/1991 | Benyacar et al. | 379/119 |
| 5,006,847 A | 4/1991 | Rush et al. | 340/994 |
| 5,014,206 A | 5/1991 | Scribner et al. | 364/449 |
| 5,021,780 A | 6/1991 | Fabiano et al. | 340/994 |
| 5,021,789 A | 6/1991 | Fabiano et al. | 264/436 |
| 5,048,079 A | 9/1991 | Harrington et al. | 379/112 |
| 5,068,656 A | 11/1991 | Sutherland | 340/989 |
| 5,097,429 A | 3/1992 | Wood et al. | 364/569 |
| 5,103,475 A | 4/1992 | Shuen | 379/115 |
| 5,113,185 A | 5/1992 | Ichikawa | 340/995 |
| 5,121,326 A | 6/1992 | Moroto et al. | 364/449 |
| 5,122,959 A | 6/1992 | Nathanson et al. | 364/436 |
| 5,131,020 A | 7/1992 | Liebesney et al. | 379/59 |
| 5,144,301 A | 9/1992 | Jackson et al. | 340/994 |
| 5,155,689 A | 10/1992 | Wortham | 364/460 |
| 5,168,451 A | 12/1992 | Bolger | 364/436 |
| 5,179,584 A | 1/1993 | Tsumura | 379/114 |
| 5,218,629 A | 6/1993 | Dumond, Jr. et al. | 379/59 |
| 5,218,632 A | 6/1993 | Cool | 379/126 |
| 5,223,844 A | 6/1993 | Mansell et al. | 342/357 |
| 5,243,529 A | 9/1993 | Kashiwazaki | 364/449 |
| 5,271,484 A | 12/1993 | Bahjat et al. | 187/29.1 |
| 5,299,132 A | 3/1994 | Wortham | 364/460 |
| 5,323,456 A | 6/1994 | Oprea | 379/375 |
| 5,351,194 A | 9/1994 | Ross et al. | 364/449 |
| 5,361,296 A | 11/1994 | Reyes et al. | 379/96 |
| 5,381,338 A | 1/1995 | Wysocki et al. | 364/449 |
| 5,381,467 A | 1/1995 | Rosinski et al. | 379/121 |
| 5,394,332 A | 2/1995 | Kuwahara et al. | 364/449 |
| 5,398,190 A | 3/1995 | Wortham | 364/460 |
| 5,400,020 A | 3/1995 | Jones | 340/994 |
| 5,420,794 A | 5/1995 | James | 364/436 |
| 5,428,546 A | 6/1995 | Shah et al. | 364/449 |
| 5,432,841 A | 7/1995 | Rimer | 379/59 |
| 5,440,489 A | 8/1995 | Newman | 364/426.05 |
| 5,444,444 A | 8/1995 | Ross | 340/994 |
| 5,446,678 A | 8/1995 | Saltzstein et al. | 364/514 |
| 5,448,479 A | 9/1995 | Kemner et al. | 365/424.02 |
| 5,461,374 A | 10/1995 | Lewiner et al. | 340/994 |
| 5,483,234 A | 1/1996 | Correel et al. | 340/994 |
| 5,483,454 A | 1/1996 | Lewiner et al. | 364/443 |
| 5,493,295 A | 2/1996 | Lewiner et al. | 340/994 |
| 5,493,694 A | 2/1996 | Vlcek et al. | 455/53.1 |
| 5,506,893 A | 4/1996 | Buscher et al. | 379/114 |
| 5,513,111 A | 4/1996 | Wortham | 364/460 |
| 5,515,421 A | 5/1996 | Sikand et al. | 379/67 |
| 5,519,621 A | 5/1996 | Wortham | 364/460 |
| 5,526,401 A | 6/1996 | Roach, Jr. et al. | 379/59 |
| 5,539,810 A | 7/1996 | Kennedy, III et al. | 379/59 |
| 5,544,225 A | 8/1996 | Kennedy, III et al. | 379/59 |
| 5,546,444 A | 8/1996 | Roach, Jr. et al. | 379/59 |
| 5,552,795 A | 9/1996 | Tayloe et al. | 342/357 |
| 5,559,871 A | 9/1996 | Smith | 379/115 |
| 5,570,100 A | 10/1996 | Grube et al. | 364/446 |
| 5,577,101 A | 11/1996 | Bohm | 379/58 |
| 5,579,376 A | 11/1996 | Kennedy, III et al. | 379/60 |
| 5,587,715 A | 12/1996 | Lewis | 342/357 |
| 5,594,650 A | 1/1997 | Shah et al. | 364/449.1 |
| 5,594,787 A | 1/1997 | Ohshima et al. | 379/114 |
| 5,602,739 A | 2/1997 | Haagenstad et al. | 364/436 |
| 5,623,260 A | 4/1997 | Jones | 340/994 |
| 5,648,770 A | 7/1997 | Ross | 340/994 |
| 5,652,707 A | 7/1997 | Wortham | 364/460 |
| 5,657,010 A | 8/1997 | Jones | 340/994 |
| 5,668,543 A | 9/1997 | Jones | 340/994 |
| 5,673,305 A | 9/1997 | Ross | 379/58 |
| 5,680,119 A | 10/1997 | Magliari et al. | 340/904 |
| 5,694,322 A | 12/1997 | Westerlage et al. | 364/464 |
| 5,694,459 A | 12/1997 | Backaus et al. | 379/427 |
| 5,699,275 A | 12/1997 | Beasley et al. | 364/514 R |
| 5,712,908 A | 1/1998 | Brinkman et al. | 379/119 |
| 5,715,307 A | 2/1998 | Zazzera | 379/265 |
| 5,719,771 A | 2/1998 | Buck et al. | 364/443 |
| 5,724,243 A | 3/1998 | Westerlage et al. | 364/446 |
| 5,724,584 A | 3/1998 | Peters et al. | 395/671 |
| 5,729,597 A | 3/1998 | Bhusri | 379/115 |
| 5,732,074 A | 3/1998 | Spaur et al. | 370/313 |
| 5,734,981 A | 3/1998 | Kennedy, III et al. | 455/445 |
| 5,736,940 A | 4/1998 | Burgener | 340/994 |
| 5,739,774 A | 4/1998 | Olandesi | 340/994 |
| 5,742,672 A | 4/1998 | Burk | 379/198 |
| 5,751,245 A | 5/1998 | Janky et al. | 342/357 |
| 5,760,742 A | 6/1998 | Branch et al. | 342/457 |
| 5,771,282 A | 6/1998 | Friedes | 379/121 |
| 5,771,455 A | 6/1998 | Kennedy, III et al. | 455/456 |
| 5,774,825 A | 6/1998 | Reynolds | 364/449.7 |
| 5,781,156 A | 7/1998 | Krasner | 342/357 |
| 5,784,443 A | 7/1998 | Chapman et al. | 379/119 |
| 5,793,853 A | 8/1998 | Sbisa | 379/120 |
| 5,796,365 A | 8/1998 | Lewis | 342/357 |
| 5,799,073 A | 8/1998 | Fleischer, III et al. | 379/113 |
| 5,799,263 A | 8/1998 | Culbertson | 701/117 |
| 5,805,680 A | 9/1998 | Penzias | 379/118 |
| 5,808,565 A | 9/1998 | Matta et al. | 340/994 |
| RE35,920 E | 10/1998 | Sorden et al. | 342/457 |
| 5,835,580 A | 11/1998 | Frazer | 379/115 |
| 5,841,847 A | 11/1998 | Graham et al. | 379/114 |
| 5,852,659 A | 12/1998 | Welter, Jr. | 379/116 |
| 5,864,610 A | 1/1999 | Ronen | 379/127 |
| 5,875,238 A | 2/1999 | Glitho et al. | 379/116 |
| 5,881,138 A | 3/1999 | Kearns et al. | 379/114 |
| 5,910,979 A | 6/1999 | Goel et al. | 379/120 |
| 5,912,954 A | 6/1999 | Whited et al. | 379/115 |
| 5,915,006 A | 6/1999 | Jagadish et al. | 379/127 |
| 5,920,613 A | 7/1999 | Alcott et al. | 379/114 |
| 5,922,040 A | 7/1999 | Prabhakaran | 701/117 |
| 5,937,044 A | 8/1999 | Kim | 379/121 |
| 5,943,320 A | 8/1999 | Weik et al. | 370/259 |
| 5,943,406 A | 8/1999 | Leta et al. | 379/120 |
| 5,943,657 A | 8/1999 | Freestone et al. | 705/400 |
| 5,945,919 A | 8/1999 | Trask | 340/825.491 |
| 5,946,379 A | 8/1999 | Bhusri | 379/115 |
| 5,950,174 A | 9/1999 | Brendzel | 705/34 |
| 5,955,974 A | 9/1999 | Togawa | 340/994 |
| 5,956,391 A | 9/1999 | Melen et al. | 379/114 |
| 5,982,864 A | 11/1999 | Jagadish et al. | 379/115 |
| 5,987,103 A | 11/1999 | Jagadish et al. | 379/114 |
| 5,987,377 A | 11/1999 | Westerlage et al. | 701/204 |
| 5,991,377 A | 11/1999 | Malik | 379/114 |
| 5,991,380 A | 11/1999 | Bruno et al. | 379/115 |
| 5,991,381 A | 11/1999 | Bouanaka et al. | 379/115 |
| 5,995,602 A | 11/1999 | Johnson et al. | 379/116 |
| 6,006,159 A | 12/1999 | Schmier et al. | 701/200 |
| 6,094,149 A | 7/2000 | Wilson | 340/904 |
| 6,097,317 A | 8/2000 | Lewiner et al. | 340/994 |

| | | |
|---|---|---|
| 6,111,538 A | 8/2000 | Schuchman et al. ........ 342/357 |
| 6,124,810 A | 9/2000 | Segal et al. ................. 340/994 |
| 6,134,501 A | 10/2000 | Oumi ......................... 701/209 |
| 6,137,425 A | 10/2000 | Oster et al. ................. 340/994 |
| 6,144,301 A | 11/2000 | Frieden ................... 340/572.8 |
| 6,178,378 B1 | 1/2001 | Leibold ...................... 701/202 |
| 6,184,802 B1 | 2/2001 | Lamb .......................... 340/994 |
| 6,191,708 B1 | 2/2001 | Davidson .................... 340/994 |
| 6,222,462 B1 | 4/2001 | Hahn .......................... 340/904 |
| 6,240,362 B1 | 5/2001 | Gaspard, II ................. 701/209 |
| 6,253,146 B1 | 6/2001 | Hanson et al. .............. 701/202 |
| 6,253,148 B1 | 6/2001 | Decaux et al. .............. 701/204 |
| 6,278,936 B1 | 8/2001 | Jones .......................... 701/201 |
| 6,313,760 B1 | 11/2001 | Jones .......................... 340/994 |
| 6,317,060 B1 | 11/2001 | Jones .......................... 340/994 |
| 6,360,101 B1 | 3/2002 | Irvin ........................... 445/456 |
| 6,363,254 B1 | 3/2002 | Jones et al. ................. 455/456 |
| 6,363,323 B1 | 3/2002 | Jones .......................... 701/213 |
| 6,374,176 B1 | 4/2002 | Schmier et al. ............. 701/200 |
| 6,377,210 B1* | 4/2002 | Moore .................... 342/357.13 |
| 6,400,956 B1 | 6/2002 | Richton ....................... 455/456 |
| 6,411,891 B1 | 6/2002 | Jones .......................... 701/201 |
| 6,415,207 B1 | 7/2002 | Jones ............................. 701/1 |
| 6,486,801 B1 | 11/2002 | Jones .......................... 340/994 |
| 6,492,912 B1 | 12/2002 | Jones .......................... 340/994 |
| 6,510,383 B1 | 1/2003 | Jones .......................... 340/994 |
| 6,515,595 B1* | 2/2003 | Obradovich et al. ........ 340/905 |
| 6,618,668 B1* | 9/2003 | Laird .......................... 701/204 |
| 6,628,233 B2* | 9/2003 | Knockeart et al. ........ 342/357.1 |
| 2002/0016171 A1 | 2/2002 | Doganata et al. ........... 455/456 |
| 2002/0069017 A1 | 6/2002 | Schmier et al. ............. 701/213 |
| 2002/0070882 A1 | 6/2002 | Jones |
| 2002/0082770 A1 | 6/2002 | Jones |
| 2002/0099500 A1 | 7/2002 | Schmier et al. ............. 701/200 |
| 2003/0098802 A1 | 5/2003 | Jones .......................... 340/994 |

FOREIGN PATENT DOCUMENTS

| | | |
|---|---|---|
| EP | 0805427 A1 | 11/1997 |
| FR | 2 559 930 | 8/1985 |
| FR | 2674355 | 9/1992 |
| JP | 52066175 | 6/1977 |
| JP | 63288400 | 11/1988 |
| JP | 11034872 A | 2/1999 |
| WO | WO 90/01236 | 2/1990 |
| WO | WO 93/13503 | 7/1993 |
| WO | WO 93/13510 A1 | 7/1993 |
| WO | WO 94/02922 | 2/1994 |
| WO | WO 94/27264 | 11/1994 |
| WO | WO 96/04634 | 2/1996 |
| WO | WO 96/16386 | 5/1996 |
| WO | WO 98/07128 | 2/1998 |
| WO | WO 98/08206 | 2/1998 |
| WO | WO 98/14926 | 4/1998 |
| WO | WO 98/40837 | 9/1998 |

OTHER PUBLICATIONS

"Vehicle Location and Fleet Management Systems", IEE Colloquium, Computing and Control Division, Jun. 8, 1993.
The 3rd International Conference on Vehicle Navigation & Information Systems (VNIS) Norway, Sep. 2-4, 1992, pp. 312-315.
Preiss, George; Jenson, Lillian; "The Satref and GPS Information Projects", 1992 IEEE—3rd International Conference on Vehcile Navigation Information Systems, pp. 648-655.
"Vehicle Navigation & Information Systems Conference Proceedings" (P-253), Society of Automotive Engineers, Inc., Oct. 1991, pp. 789-796.
"1992 Compendium of Technical Papers", Institute of Transportation Engineers—INRAD: A Deminostration of Two-Way Roadway to Vehicle Communication for use in Traffic Operations, Annual Meeting, Washington, D.C. pp. 214-218.
"Paving the Way for GPS in Vehicle Tracking", Showcase World, Dec. 1992.
"Advanced Vehicle Monitoring and Communication Systems for Bus Transit", Federal Transit Administration, Sep. 1991, Revised Mar. 1993.
Koncz, et al., "GIS-Based Transit Information Bolsters Travel Options", GIS World, Jul. 1995, pp. 62-64.
Helleker, Jan, Real-Time Traveller Information—in everyone's pocket?!—a pilot test using hand-portable GSM terminals, IEEE—IEE Vehicle Navigation & Information systems Conference, Ottawa, VNIS 1993, pp. 49-52.
Burgener, E.C., et al., "A Personal Transit Arrival Time Receiver", IEEE—IEE Vehicle Navigation & Information Systems Conference, Ottawa, VNIS 1993, pp. 54-55.
Peng, Zhong-Ren, "A Methodology for Design for a GIS-Based Automatic Transit Traveler Information System", Computer, Environment and Urban Systems, vol. 21, No. 5, pp. 359-372, 1997.
Lessard, Robert, "The Use of Computer for Urban Transit Operations", IEEE—IEE Vehicle Navigation & Information systems Conference, Ottawa, VNIS 1993, pp. 586-590.
Sommerville, Fraser, et al., "Reliable Information in Everyone's Pocket—a Pilot Test", IEEE, vol. 1927, Mar. 1994, pp. 425-428.
"PROMISE—Personal Mobile Traveller and Traffic Information Service—Specification of Promise Services, Ver. 7", Telematics Application Programme A2, Transport, Jul. 1, 1996.
"PROMISE—Personal Mobile Traveller and Traffic Information Service—Generic Promise System Architecture, Ver. 2", Telematics Application Programme A2, Transport, Sep. 10, 1996.
"PROMISE—Personal Mobile Traveller and Traffic Information Service—Summary of Promise Public Relation Activities, Ver. 1", Telematics Application Programme A2, Transport, Feb. 12, 1999.
"PROMISE—A Personal Mobile Traveller and Traffic Information Service—Abstract", The Institution of Electrical Engineers, 1997.
Sommerville, Fraser, et al., "The Promise of Increased Patronage", The Institution of Electrical Engineers, 1993, pp. 3/1-3/4.
"Automatic Transit Location System", Washington State Department of Transportation, Final Report, Feb. 1996.
"Advanced Traveler Aid Systems for Public Transportation", Federal Transit Administration, Sep. 1994.
"Advanced Vehicle Monitoring and Communication Systems for Bus Transit: Benefits and Economic Feasibility", U.S. Department of Transportation, Urban Mass Transportation Administration, Sep. 1991.
Leong, Robert, et al., "An Unconventional Approach to Automatic Vehicle Location and Control for Urban Transit", IEEE 1989, pp. 219-223.
"1994 Vehicle Navigation & Information Systems Conference Proceedings", Yokahama, Japan, Aug. 31-Sep. 2, 1994, pp. 807-810.
"Vehicle Navigation & Information Systems Conference Proceedings—P-253, Part 2", Society of Automotive Engineers, Inc., Oct. 1991.
Vehicle Navigation & Information Systems—Conference Record of Papers presented at the 3rd Vehicle Navigation & Information Systems Conference 1992., Reso Hotel, Osio Plaza., pp. 49-52.
Nelson, J. Richard, "Experiences Gained in Implementing an Economical Universal Motorist System", IEEE—IEE Vehicle Navigation & Information Systems Conference, Ottawa, VNIS 1993, pp. 67-71.
"The Cassiope/Eurobus Approach", IEEE—IEE Vehicle Navigation & Information Systems Conference, Ottawa, VNIS 1993, pp. 79-81.
Kihl, Mary, "Advanced Vehicle Location System for Paratransit in Iowa", IEEE—IEE Vehicle Navigation & Information Systems Conference, Ottawa, VNIS 1993, pp. 381-384.
Gault, Helen, et al., "Automatic Vehicle Location and Control at OC Transpo", IEEE—IEE Vehicle Navigation & Information Systems Conference, Ottawa, VNIS 1993, pp. 596-600.
Vehicle navigation & Information System—Conference Record of Papers presented at the First Vehicle Navigation and Information Systems Conference (VNIS '89), Sep. 11-13, 1999, pp. 602-605.
Heti, Gabriel, "Travelguide: Ontario's Route Guidance System Demonstration", IEEE—IEE Vehicle Navigation & Information Systems Conference, Ottawa, VNIS 1993, pp. A13-A18.
Jeffery, D.J., et al., "Advanced Traveller Information Systems in the UK: Experience from the Pleiades and Romanse Projects", IEEE—IEE Vehicle Navigation & Information Systems Conference, Ottawa, VNIS 1993, pp. 309-313.
Sweeney, Lawrence, E., et al., "Travinfo: A Progress Report", 1994 Vehicle Navigation & Information Systems Conference Proceedings, Yokahama, Japan, Aug. 31-Sep. 2, 1994, pp. 315-320.
Shimamura, Yta, et al., "Combined Position Detection System for Pedestrian/Train Mode", 1994 Vehicle Navigation & Information Systems Conference Proceedings, Yokahama, Japan, Aug. 31-Sep. 2, 1994, pp. 603-606.
Zavoli, Walt, "Customer Location Services", 1994 Vehicle Navigation & Information Systems Conference Proceedings, Yokahama, Japan, Aug. 31-Sep. 2, 1994, pp. 613-617.
Tanaka, Yoshimi, et al., "Automatic Traffic Information Provision System Utilizing Facsimile and Telephone (Now Operating in Osaka), 1994 Vehicle Navigation & Information Systems Conference Proceedings", Yokahama, Japan, Aug. 31-Sep. 2, 1994, pp. 627-632.
McDonald, Mike, et al., "Romanse (Road Management System for Europe) Project", 1994 Vehicle Navigation & Information Systems Conference Proceedings, Yokahama, Japan, Aug. 31-Sep. 2, 1994, pp. A-11-A-14.
Scott III, Robert H., "Computer-Aided Dispatch", 1998, pp. 46-50.
Moore, Rodney J., "Hold the Phone!", American Demographics, Ithaca, Jan./Feb. 1996, p. 68.
Delong, Jr., Edgar S., "Making 911 even better", Telephony, Dec. 14, 1987, pp. 60-63.
Bruzek, Frank J., "Class Calling Service—A Consumer Service Perspective", Globecom '85 IEEE Global Telecommunications Conference, Dec. 2-5, 1985, vol. 1 of 3, pp. 11.4.1-11.4.4.
Powell, R., et al., "Real Time Passenger Information System for the Romanse Project", Colloouin Digest—IEE, Boston, Sep. 1993, pp. 9/1-9/3.
Huber, Paul, "Public Transport Information Systems in Munich", Intelligent Transport Systems World Congress '95—Second Wold Congress on Intelligent Transport Systems, Yokohama, Japan, Nov. 9-11, 1995, pp. 2362-2366.
Ronez, Nicholas, et al, "GIS-Based Transit Information Bolsters Travel Options", GIS World, vol. 6, part 7, Jun. 1995, pp. 62-64.
Catling, Ian, et al., "TABASCO—Improving Transport Systems in Europe", Pacific Rim TransTech Conference, Jul. 30-Aug. 2, 1995, 995 Vehicle Navigation & Information Systems Conference Proceedings, Washington State Convention and Trade Center, Seattle, Washington, USA, pp. 503-507.
Dailey, D.J., "Demonstration of an Advance Public Transportation System in the Context of an IVHS Regional Architecture", Proceedings of the First World Congress on Applications of Transport Telematics and Intelligent Vehicle-Highway Systems, Nov. 30-Dec. 3, 1994, Paris, France, pp. 3024-3031.
Hubner, Paul, "Advance Public Transportation Information in Munich", International Conference on Public Transport Electronic Systems, Conference Publication No. 42, Jun. 1996.
Thompson, S.M., et al., "Exploiting Telecommunications to Delivery Real Time Transport Information", Road Transport Information and Control, Apr. 21-23, 1998, pp. 59-63, Conference Publication No. 454 IEE 1998.
Kaminitzer, David, et al., Driver Information Systems: Influencing your Route, IEE Seminar, Mar. 3, 1999, pp. 5/1-5/5.
"Board Cites ATC in Spokane Near Miss", Article in Aviation Week & Space Technology, Mar. 28, 1977, URL: http://www.aviationnow.com.
Shifrin, Carole A., "Gate Assignment Expert System Reduces Delays at United's Hubs", Article in Aviation Week & Space Technology, Jan. 25, 1988.
"United Airlines applies TI's advance technologies to improve gate management at major airports", Article in Business Wire, Inc., Nov. 19, 1987.
Musich, Paula, "Airline Designs Software to move planes, people; Unite Airline's use of Covia Corp.'s Open Systems Manager, Connectivity Section", Article in PC Week, Jun. 7, 1988, vol. 5, No. 23, p. C11.
Stoll, Marilyn, "Systems help Airlines Manage Gate Schedules; Connectivity Supplement", PC Week, Jul. 25, 1988, vol. 5, No. 30, p. C4.
Reddy, Shyamala, "Traveling LAN: United Airlines Networks Its Terminals", Article in The Local Area Network Magazine, Jan. 1990, vol. 5, No. 1, p. 108.
Fisher, Sharon, "Networked Airport Systems help Travelers find their way; United Airlines subsidiary Covia Corp. devices integrated network.", Article in Software Magazine, Mar. 15, 1990, vol. 10, No. 4, p. 31.
Henderson, Danna K., "Automation Takes aim at airports: the power of the networked PC is being unleashed on passenger handling and ramp activities worldwide.", Article in Air Transport Wold, Aug. 1990., vol. 27, No. 8, p. 52.
"United Airlines introduces United Cargo Plug I, a new cargo computer system to serve freight forwarders", Business Wire, Oct. 22, 1990.
Miller, Barry, "Special Report: Airline Equipment, Service Center", Aviation Week & Space Technology, Aug. 25, 1975, p. 51.
Lyon, Mark W., "Cargo Net Debate Splits Industry", Journal of Commerce, Specials, p. 4, Jul. 27, 1992.
Davies, I.L., et al., "Electronics and the Aeroplane", Proceedings of the Institution of Electrical Engineers, Paper No. 7604, delivered before the IEE Electronics Division, Oct. 29, 1975.
"Global Niche", Flight International, Sep. 26, 1990.
"Real-Time Briefings", Aviation Week and Space Technology, Oct. 13, 1986.
Flanagan, Mike, et al., "Amelia Earhart—Mystery Still Clouds Soaring Achievements", Chicago Tribune, Jul. 5, 1987, Final Edition, p. 5, Tempo Woman.
"Official Airline Guides", Airports®, Nov. 20, 1990, Around Airports, vol. 7, No. 47, p. 485.
"Automation System Gains Acceptance", Aviation Week & Space Technology, Nov. 23, 1992, vol. 137, No. 21, p. 97.
Klass, Philip, "French Testing Ground-Derived MLS", Aviation & Space Technology, Avionics, p. 56, Dec. 15, 1975.
"Forecast Realized for ATC System", Aviation & Space Technology, Mar. 17, 1975, Avionics, p. 168.
Henderson, Danna, et al., "Ionworks: America West Automates New Phoenix Terminal Fully Integrated System to Handle Customer-Service Demands (America West Airlines Inc) (Includes Related Article Automation of passenger Service at Airports)", Airport Transport World, May 1, 1991. vol. 62.
3 Pages from a web site search under http://mit.edu/afs/net.mit/edu/project/attic/usa-today/tech/37, Jun. 12, 2003.
"What's New in passenger Handling Equipment", Air Transport World, vol. 24, p. 62, Sep. 1987.
"Senator Urges Acceleration of Navstar", Aviation & Space Technology, Avionics, p. 153, Oct. 3, 1983.
"AFSC Broadens Joint Program Efforts", Aviation & Space Technology, System Acquisition, p. 83, Jul. 19, 1976.
Herskovitz, Don, "GPS Insurance Antijamming the System; Brief Article", Journal of Electronic Defense, Dec. 1, 2000, No. 12, vol. 23, p. 41.
Hambly, Richard M., et al., "Aircraft Traffic Management on the Airport Surface Using VHF Data Link for CNS", IEEE AES Systems Magazine, Mar. 1995, pp. 9-13.
Berzins, G., et al., "INMARSAT: Worldwide Mobile Satellite Services on Seas, in Air and on Land", Space Technology, vol. 10, No. 4, pp. 231-237, 1990.
Jenney, L.L., et al., "Man as Manager of Automated Resources in an Advanced Air Traffic System", J. Aircraft, vol. 12, No. 12, Dec. 1975.
"Routing & Scheduling System improvements from RTSI; Routing Technology Software, Inc.; Product Announcement", Modern Brewery Age, vol. 43, No. 3, p. 11S, Jan. 20, 1992.
Yanacek, Frank, "Hitching to the stars; satellites for shipment tracking", Research Information Transportation Journals, Combined, No. 6, vol. 29, p. 16.
Stoll, Marilyn, "For on-the-road firms, hand-held terminals are pivotal. Connectivity", Research Information Transportation Journals, Combined, No. 34, vol. 5, p. C11.
"IBM and Hunt to Market New Truck Tracker; International Business Machines", J.B. Hunt Transport Services; Brief Article, No. 210, vol. 101, p. 4.

Klass, Philip J., "Two Carriers Plan Automatic Data Link", Aviation Week and Space Technology, Air Transport Section, May 23, 2977, p. 36.

"Data Link Evolved Over Three Decades", Aviation Week and Space Technology, Air Transport Section, May 23, 1977, p. 36.

Klass, Philip J., "American to Install Printers in Cockpits", Aviation Week and Space Technology, Avionics, Jul. 21, 1980, p. 56.

Lefer, Henry, "Computers on a boon to E&M, but at a price", Air Transport World, vol. 23, p. 53, Feb. 1986.

Donaghue, J.A., "Choice of Data Link Systems Expands as New Generation Hits the Market", Air Transport World, vol. 20, p. 58, Apr. 1983.

Klass, Philip J., "Digital Network Could Improve Aircraft Links to Operations, ATC", Aviation Week and Space Technology, International Air Transport Section, vol. 131, No. 21, p. 121, Nov. 20, 1989.

Board Cites ATC in Spokane Near Miss, Article in Aviation Week & Space Technology, Safety Section, Mar. 28, 1977, p. 59.

"Vicorp Interactive Systems", Aviation Daily, Aviation Suppliers Section, vol. 309, No. 17, p. 147.

Neumann, Dr. Horst, "ATC Concepts with Extensive Utilization of Automatic Data Processing", pp. 4-1 to 4-9; No Publication Information or Date Information Provided.

Maxwell, Robert L., "Automation Possibilities in Air Traffic Control", pp. 561-563, No Publication Information or Date Information Available.

"History of GPS", 3 pages, No Publication Information or Date Information Available.

"Road Transport Research—Intelligent Vehicle High Systems—Review of Field Trials", prepared by An OECD Scientific Expert Group, pp. 1-101, Organisation for Economic Co-Operation and Development—No Date Information Available.

Ratcliff, Robert, et al., Transportation Resources Information Processing System (TRIPS), pp. 109-113, No Publication Information or Date Information Available.

Balke, Kevin, et al., Collection and Dissemination of Real-Time Travel Time and Incident Information with In-Vehicle Communication Technologies, pp. 77-82, No Publication Information or Date Information Available.

Moriok, et al., "Advanced Vehicle Monitoring and communication Systems for Bus Transit—Benefits and Economic Feasibility", Final Report—U.S. Department of Transportation, Sep. 1991, Revised Mar. 1993, Dot-T-94-03.

Brynielsson, Thore, Step by Step Development Towards Attractive Public Transport, Chalmers University of Technology, Gotebord, Sweden, Department of Transportation, 1976.

U.S. Appl. No. 09/588,508, filed Apr. 26, 2003, Jones.
U.S. Appl. No. 08/762,052, filed Dec. 9, 1996, Jones.
U.S. Appl. No. 09/852,199, filed May 6, 1997, Jones.
U.S. Appl. No. 09/516,288, filed Mar. 1, 2000, Jones.
U.S. Appl. No. 09/163,588, filed Sep. 30, 1998, Jones.
U.S. Appl. No. 10/436,346, filed May 12, 2003, Jones.
U.S. Appl. No. 10/300,460, filed Nov. 20, 2002, Jones.
U.S. Appl. No. 10/322,956, filed Dec. 18, 2002, Jones.
U.S. Appl. No. 10/326,556, filed Dec. 20, 2002, Jones.
U.S. Appl. No. 10/435,765, filed May 12, 2003, Jones.
U.S. Appl. No. 10/436,120, filed May 12, 2003, Jones.
U.S. Appl. No. 10/436,119, filed May 12, 2003, Jones.
U.S. Appl. No. 10/435,770, filed May 12, 2003, Jones.
U.S. Appl. No. 10/326,196, filed May 12, 2003, Jones.

* cited by examiner

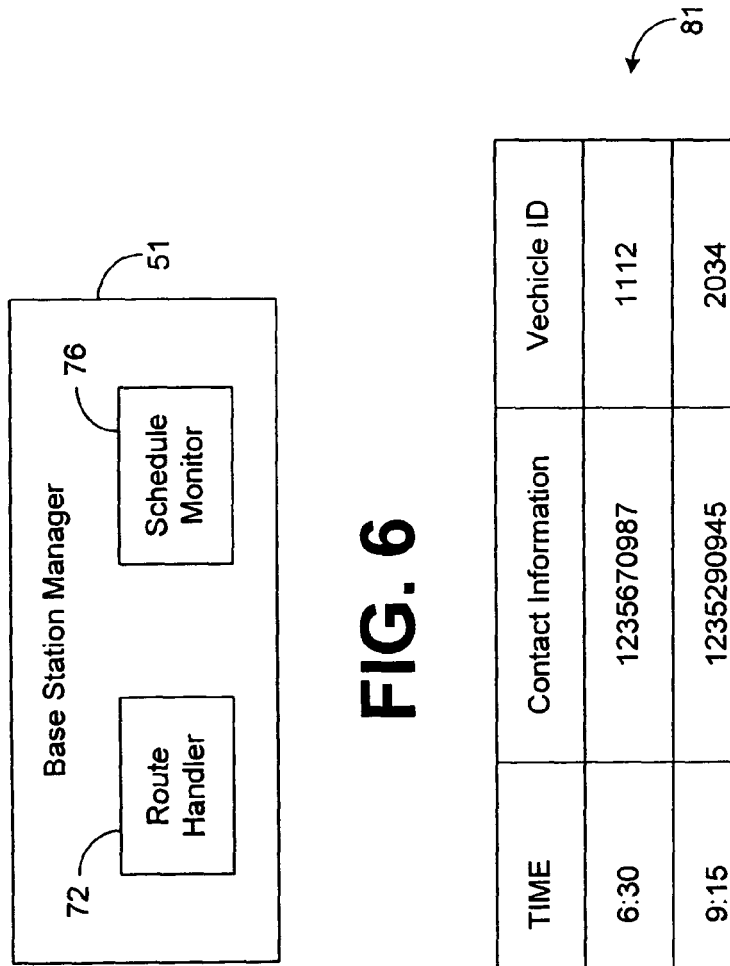

NOTIFICATION SYSTEMS AND METHODS ENABLING USER ENTRY OF NOTIFICATION TRIGGER INFORMATION BASED UPON MONITORED MOBILE VEHICLE LOCATION

CLAIM OF PRIORITY AND CROSS-REFERENCE TO RELATED APPLICATIONS

This application is a continuation of application Ser. No. 09/558,508, filed Apr. 26, 2000 now U.S. Pat. No. 6,618, 668, which is a continuation-in-part of application Ser. No. 08/852,119, filed on May 6, 1997 now U.S. Pat. No 6,748, 318, which claims priority to provisional application Ser. No. 60/039,925, filed Mar. 10, 1997, and which is a continuation of (a) application Ser. No. 08/434,049, filed May 2, 1995, now U.S. Pat. No. 5,623,260, (b) application Ser. No. 08/432,898, filed May 2, 1995, now U.S. Pat. No. 5,657,010, and (c) application Ser. No. 08/432,666, filed May 2, 1995, where documents (a), (b), and (c) are each a continuation-in-part of the application Ser. No. 08/407,319, filed Mar. 20, 1995, now abandoned, which is a continuation-in-part of an application Ser. No. 08/063,533, filed May 18, 1993, now U.S. Pat. No. 5,400,020. All of the foregoing documents are incorporated by reference herein in their entirety.

RELATED ART

U.S. Pat. No. 5,400,020, entitled, "ADVANCE NOTIFICATION SYSTEM AND METHOD," which is incorporated herein by reference, describes an advance notification system that provides users with notice of an impending arrival of a vehicle at a particular location. In this regard, a location sensor, such as a global positioning system (GPS) sensor, is attached to a vehicle associated with the system. Based on the output of the location sensor, the location of the vehicle is monitored by a control unit or control units located on the vehicle and/or at a stationary base station remotely located from the vehicle. When it is determined that the vehicle is within a predefined proximity (i.e., a particular time or distance) from a particular location of interest to a user (e.g., a vehicle stop), a notification message is transmitted to the user to notify the user of the impending arrival of the vehicle. The user may then prepare for the impending arrival of the vehicle in response to the notification message.

There are a variety of passenger and/or package transportation services pickup and/or delivery applications that may utilize the advance notification system. However, as the number of users and/or vehicle stops associated with the services being offered increases, the complexity of the advance notification can increase dramatically. For example, a regional package transportation service that services a major metropolitan city may deliver tens of thousands of packages per day. Likewise, passenger transportation services servicing a metropolitan area or a county-wide school system may transport many thousands of passengers per day as well.

Therefore, the process of producing the vehicle schedules (i.e., the routes and times that the vehicle should travel) required to transport the packages or passengers can be quite burdensome and complicated. Furthermore, when an advance notification system is employed, schedules should indicate not only the route for each vehicle but should also indicate when notification messages should be transmitted for each transported package or passenger. The information indicating when the users are to be notified or where a delivery or pick-up is to occur may be provided by each individual user. Needless to say, obtaining and maintaining the necessary information to provide users with advance notification of arrivals of vehicles can be quite burdensome and complicated in many applications.

Further adding to the complexity of the advance notification system, the data necessary for producing the appropriate vehicle schedules is not always readily available. For example, when the location sensor used to monitor a vehicle is a GPS sensor, the location values produced by sensor are coordinate values (e.g., longitude and latitude values). These coordinate values should be compared to the location values defining the vehicle's schedule to determine when notification messages should be transmitted. Therefore, the location values produced by the sensor should be compatible with the location values of the vehicle schedule to enable accurate comparisons. However, the data input into the system that is used to define the vehicle schedule is not necessarily compatible with the location values produced by the sensor. For example, when a user would like to be picked-up or to receive delivery at a particular location, the user often knows the address of the location but does not know the coordinate values of the location. Therefore, the user may only provide address information, which is incompatible with the location values produced by the sensor, and additional steps must be taken to enable accurate comparisons.

Thus, a heretofore unaddressed need exists in the industry for a vehicle monitoring system and method for efficiently obtaining and maintaining vehicle schedule information that may be used to monitor the travel of vehicles.

BACKGROUND OF THE INVENTION

The present invention generally relates to vehicle monitoring and messaging systems and, in particular, to a vehicle monitoring system and method capable of efficiently obtaining and maintaining vehicle schedule information that is used to monitor travel of a vehicle.

SUMMARY OF THE INVENTION

The present invention overcomes many inadequacies and deficiencies of the prior art, as discussed hereinbefore. In general, the present invention provides a vehicle monitoring system and method for obtaining and maintaining vehicle schedule information and for monitoring vehicles based on the vehicle schedule information so that a notification message may be transmitted to notify at least one user when a particular vehicle is within a predefined proximity of a particular location.

In a broad sense, the system of the present invention includes a mapping application and a data manager. The mapping application receives data identifying a particular location and automatically translates this data into a set of location values. The mapping application then stores the foregoing set of location values. The data manager retrieves the stored set of location values and monitors travel of a vehicle based on location values produced by a location sensor coupled to the vehicle. The data manager compares a set of location values produced by the sensor to the stored set of location values to determine when the vehicle is within a predefined proximity of the particular location. When the data manager determines that the vehicle is within the predefined proximity of the particular location, the data manager causes a notification message to be transmitted to a user communications device to notify a user of an impending arrival of the vehicle at the particular location.

In accordance with another feature of the present invention, the mapping application produces a map displaying symbols representing various locations. The user selects from the map the particular location that is to be used to determine when the notification message is to be generated.

In accordance with another feature of the present invention, the mapping application receives data identifying a plurality of locations where items are to be delivered or picked-up by one of the vehicles being monitored by the system or method of the present invention. Based on this data, the mapping application automatically defines a set of routes that are to be driven by the foregoing vehicles. The mapping application then outputs the routes that are to be driven by each of the vehicles and, if desired, which items are to be transported by each vehicle.

The present invention can also be viewed as providing a method for tracking vehicles. The method can be broadly conceptualized by the following steps: receiving data identifying a particular location from said user interface device; automatically translating the data received in the receiving step into a set of location values; storing the set of location values; monitoring travel of a vehicle based on location values produced by a location sensor coupled to the vehicle; comparing the set of the location values produced by the location sensor to the set of location values stored in the storing step; determining when the vehicle is within a predefined proximity of the particular location based on the comparing step; causing a notification message to be transmitted to a user communications device in response to a determination in the determining step that the vehicle is within the predefined proximity of the particular location; and notifying a user of an impending arrival of the vehicle at the location via the notification message.

Other features and advantages of the present invention will become apparent to one skilled in the art upon examination of the following detailed description, when read in conjunction with the accompanying drawings. It is intended that all such features and advantages be included herein within the teachings of the present invention, as set forth herein and as sought to be protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

FIG. 6 is a block diagram illustrating a more detailed view of a base station manager depicted in FIG. 5.

FIG. 7 is a schematic illustrating an exemplary list of notification events generated by a route handler depicted in FIG. 6.

DETAILED DESCRIPTION OF THE INVENTION

Figure 1:
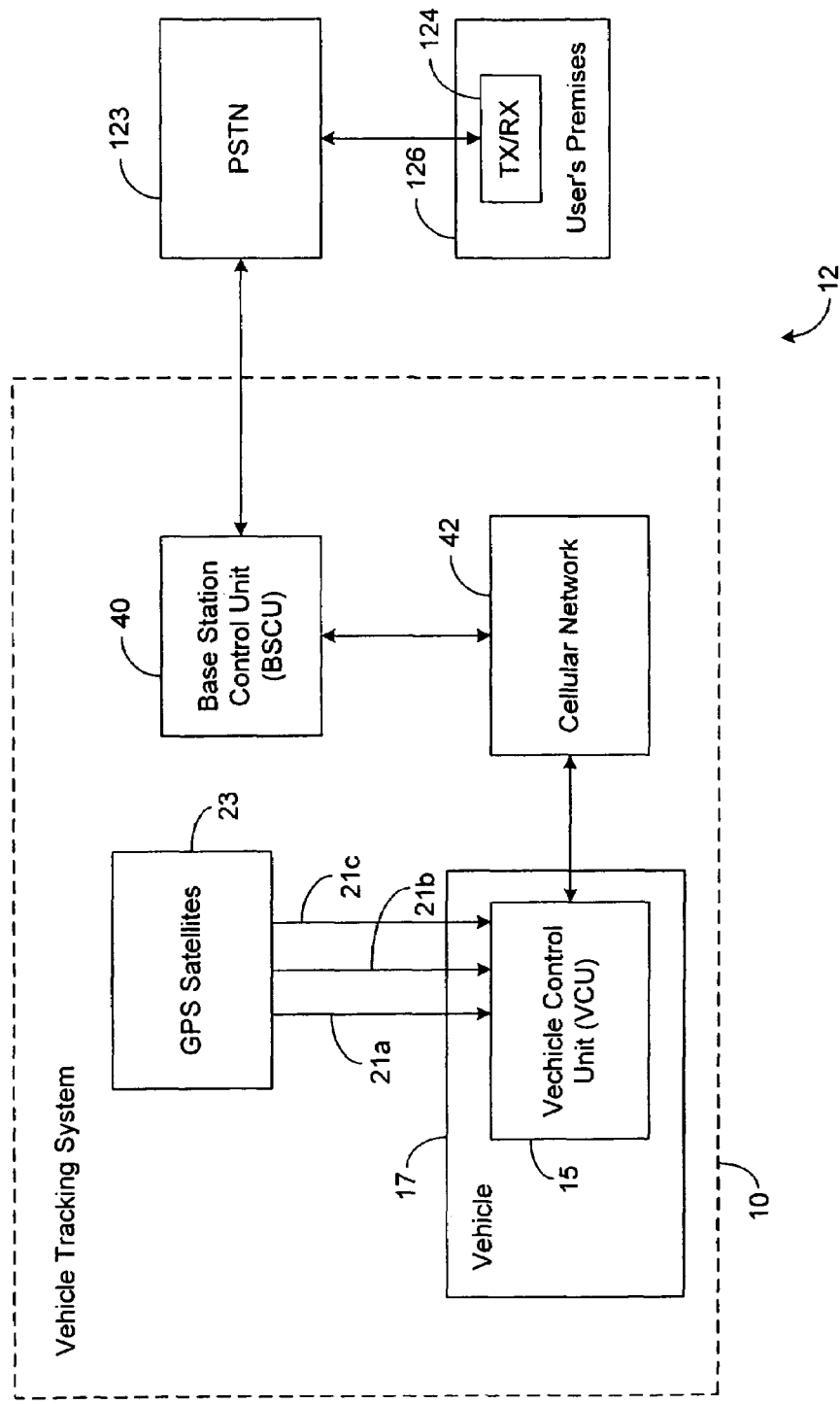
FIG. 1 is a block diagram illustrating a vehicle tracking system employed within the context of an advance notification system in accordance with the preferred embodiment of the present invention.

FIG. 1 depicts an automated vehicle tracking system 10 illustrating the principles of the present invention. As shown by FIG. 1, the vehicle tracking system 10 is preferably employed within the context of an automated advance notification system 12 that automatically provides advance notice of impending arrivals of vehicles at destinations or other locations.

As depicted in FIG. 1, a vehicle control unit (VCU) 15 is disposed on a mobile vehicle 17, which is capable of transporting the VCU 15 over various distances. U.S. patent application entitled, "System and Method for an Advance Notification System for Monitoring and Reporting Proximity of a Vehicle," assigned Ser. No. 09/163,958, and filed on Sep. 30, 1998, which is incorporated herein by reference, describes an exemplary VCU 15 that may be used to implement the principles of the present invention.

In the preferred embodiment, the vehicle 17 is a delivery vehicle for delivering items to a destination or for picking up items at a destination. Note that items can include many various types of packages or goods to be delivered or picked up. Furthermore, items can also include persons to be picked up or delivered, such as when a bus picks up and/or delivers passengers at different bus stops. Preferably, the vehicle 17 travels along a predetermined route in making its deliveries, and the vehicle 17 may make numerous stops along its route in order to deliver or pick up different items at different locations.

In the context of this document, a "vehicle" is any structure capable of moving across or through the Earth's surface and/or atmosphere. Examples of a "vehicle" include, but are not limited to, an automobile, an aircraft, a train, a boat, or items, such as a package. A "vehicle" may also be a person that carries the VCU 15 while walking or running.

Vehicle Control Unit

Figure 2:
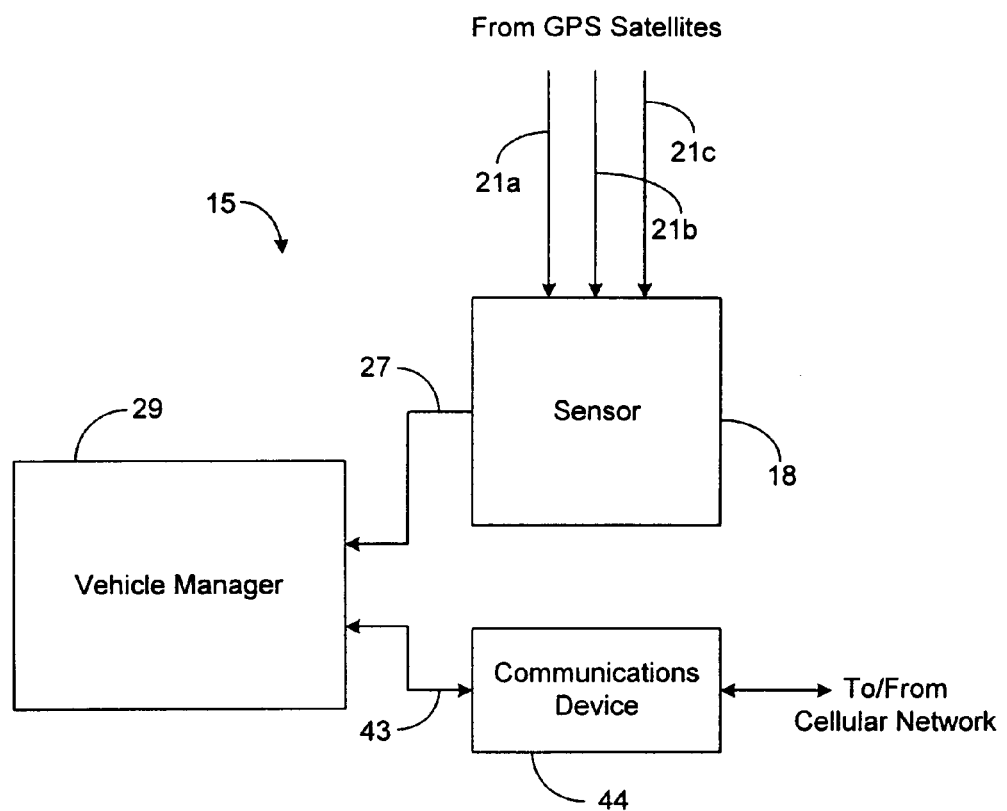
FIG. 2 is a block diagram illustrating a more detailed view of a vehicle control unit depicted in FIG. 1.

A more detailed view of the VCU 15 is depicted in FIG. 2. A sensor 18 within VCU 15 is configured to determine the location of the sensor 18 relative to a predetermined reference point. In the preferred embodiment, sensor 18 is a global positioning system (GPS) sensor, although other types of positioning systems and/or sensors can be utilized. For example, other types of sensors 18 that may be used to implement the principles of the present invention include, but are not limited to, an odometer or sensors associated with Glonass, Loran, Shoran, Decca, or Tacan. The GPS sensor 18 of the preferred embodiment is configured to receive signals 21a–21c from a plurality of GPS satellites 23, and as known in the art, sensor 18 is designed to analyze signals 21a–21c to determine the sensor's location or coordinate values relative to a predetermined reference point.

For example, in the preferred embodiment where sensor 18 is a GPS sensor, the sensor 18 determines the sensor's location values relative to the Earth's zero degree latitude and zero degree longitude reference point, which is located at the intersection of the Equator and the Prime Meridian.

U.S. Pat. No. 5,781,176 entitled, "GPS Receiver and Method for Processing GPS Signals" and filed on Apr. 23, 1997 by Krasner, which is incorporated herein by reference, discusses the processing of GPS signals 21a–21c received from GPS satellites 23 in order to determine the sensor's location values. Since the sensor 18 is located on or within the vehicle 17, the location values determined by the sensor 18 are assumed to match the location values of the vehicle 17 and the VCU 15.

It should be noted that the term "location value" shall be defined herein to mean any value or set of values that may be used to determine a location of a point on the Earth or within the Earth's atmosphere. This value may be a distance value, a coordinate value (i.e., grid value), polar value, vector value, or any other type of value or values known in the art for indicating locations of points.

Sensor 18 is designed to periodically transmit a signal 27 to vehicle manager 29 indicating the vehicle's current location values. Vehicle manager 29 is configured to receive signal 27 and to monitor the location of the vehicle 17 over time by processing multiple signals 27. The vehicle manager 29 can be implemented in software, hardware, or a combination thereof. In the preferred embodiment, as illustrated by way of example in FIG. 3, the vehicle manager 29 of the present invention along with its associated methodology is implemented in software and stored in computer memory 30 of a computer system 31.

Note that the vehicle manager 29 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the vehicle manager 29 may be magnetically stored and transported on a conventional portable computer diskette.

Figure 3:
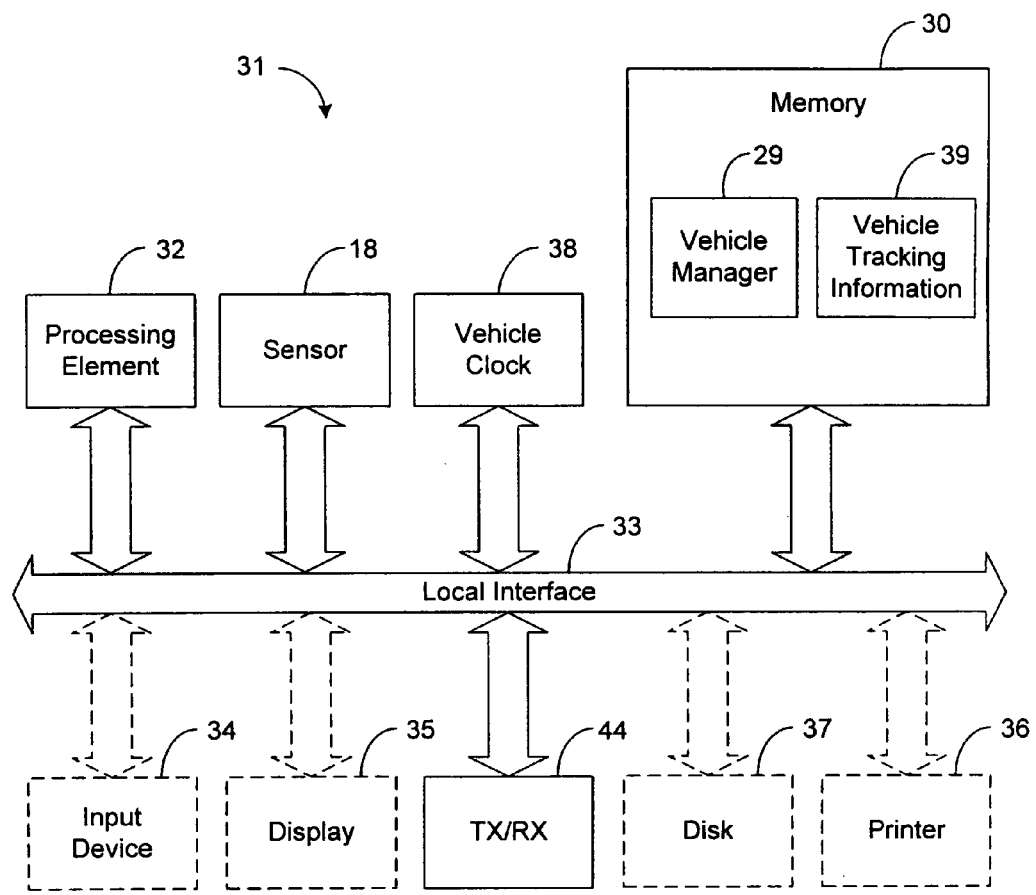
FIG. 3 is a block diagram illustrating a computer system implementing the functionality of the vehicle control unit of FIG. 2 in accordance with the preferred embodiment of the present invention.

The preferred embodiment of the computer system 31 of FIG. 3 comprises one or more conventional processing elements 32, such as a digital signal processor (DSP), that communicate to and drive the other elements within the system 31 via a local interface 33, which can include one or more buses. Furthermore, an input device 34 can be used to input data into the system 31, and screen display 35 or a printer 36 can be used to output data to the user. A disk storage mechanism 37 can be connected to the local interface 33 to transfer data to and from a nonvolatile disk (e.g., magnetic, optical, etc.). Furthermore, a vehicle clock 38 may be connected to the computer system 31 so that components of the system 31 may utilize data from the clock 38 to determine time through conventional techniques. It should be noted that input device 34, display 35, printer 36, and disk 37 are optional and are not necessarily a part of the preferred embodiment.

The vehicle manager 29 is preferably configured to maintain a predefined schedule, referred to herein as "vehicle tracking information 39," within memory 30. The predefined vehicle tracking information 39 corresponds with a route of travel for the vehicle 17. In this regard, the predefined vehicle tracking information 39 stored in memory 30 includes data defining locations or "checkpoints" along the vehicle's intended route of travel. Furthermore, each checkpoint is associated with a particular time value indicating when the vehicle 17 is expected to pass the associated checkpoint. Each checkpoint along with its associated time value may define an entry in the vehicle tracking information 39.

In the preferred embodiment, the time value associated with a checkpoint corresponds to a time of day that the vehicle 17 is expected to pass the checkpoint. For example, the time value associated with a checkpoint may define the hour and minute that the vehicle 17 is expected to pass the checkpoint. Consequently, when the vehicle 17 reaches the location defined by the checkpoint, the time of day, as defined by vehicle clock 38, can be compared with the time value in the vehicle tracking information 39 associated with the checkpoint to determine whether the vehicle 17 is early, late, or on time. It should be noted that other data and other methodologies may be employed to determine whether or not the vehicle 17 is on schedule, without departing from the principles of the present invention.

As the vehicle 17 travels along its route, the vehicle manager 29 determines when the vehicle 17 passes a checkpoint by comparing the data received from sensor 18 with the checkpoint data stored in vehicle schedule 39. When the vehicle manager 29 determines that a checkpoint has been passed, the vehicle manager 29 is configured to determine a time value indicating the time of day by analyzing vehicle clock 38, and the vehicle manager 29 is configured to compare this time value with the time value in the vehicle tracking information 39 associated with the checkpoint.

The vehicle 17 is considered to be off schedule if the value for the time of day from clock 38 differs from the time value in the vehicle tracking information 39 by a predetermined amount. Otherwise the vehicle 17 is considered to be on schedule. For example, assume that the vehicle 17 is to be considered off schedule if the vehicle 17 is early or late by more than two minutes and assume that the vehicle 17 is scheduled to pass a checkpoint at 6:30 a.m. If the vehicle 17 passes the checkpoint between 6:28 a.m. and 6:32 a.m., the vehicle 17 is on schedule. If the vehicle 17 passes the checkpoint before 6:28 a.m., the vehicle is off schedule and is early. If the vehicle 17 passes the checkpoint after 6:32 a.m., the vehicle 17 is off schedule and is late.

If the vehicle manager 29 determines that the vehicle 17 is off schedule, the vehicle manager 29 is configured to transmit a status message to a base station control unit (BSCU) 40 (FIG. 1) indicating how much the vehicle is off schedule, and the vehicle manager 29 is also configured to update the entries in the tracking information 39. For example, assume that the vehicle 17 passes the aforementioned checkpoint at 6:25 a.m. In this example, the vehicle 17 is off schedule and five minutes early. Therefore, the vehicle manager 29 transmits a status message to BSCU 40 via cellular network 42 indicating that the vehicle 17 is five minutes early and decreases the expected times stored in the tracking information 39 by five minutes. As a result, the schedule 39 is adjusted to account for the vehicle's earliness, and the vehicle 17 will not be deemed off schedule when the vehicle 17 passes the other checkpoints, provided that the rate of travel of the vehicle 17 continues as expected for the remainder of the route. Similarly, if the vehicle 17 passes the aforementioned checkpoint at 6:35 a.m., then the vehicle manager 29 is configured to transmit a status message indicating that the vehicle 17 is five minutes late and is configured to increase the times stored in the tracking information 39 by five minutes.

It should be noted that updating the vehicle tracking information 39 is not necessary in implementing the present invention. However, if the vehicle 17 is early or late at one checkpoint, the vehicle 17 will likely be respectively early or late at other checkpoints, causing the vehicle manager 29 to make an off schedule determination and to transmit a status message at each of the remaining checkpoints in the route. By updating the times in the vehicle tracking information 39, the number of status messages transmitted to the BSCU 40 may be reduced in monitoring the travel of the vehicle 17.

It should be further noted that the status message transmitted by VCU 15 may be communicated via any suitable technique and that utilization of the cellular network 42 is not necessary. In this regard, other types of networks may be used to communicate the status message, or the status message may be communicated directly to the base station control unit 40 without the use of any type of communication network. For example, the status message may be communicated via short wave radio.

Base Station Control Unit

Figure 4:
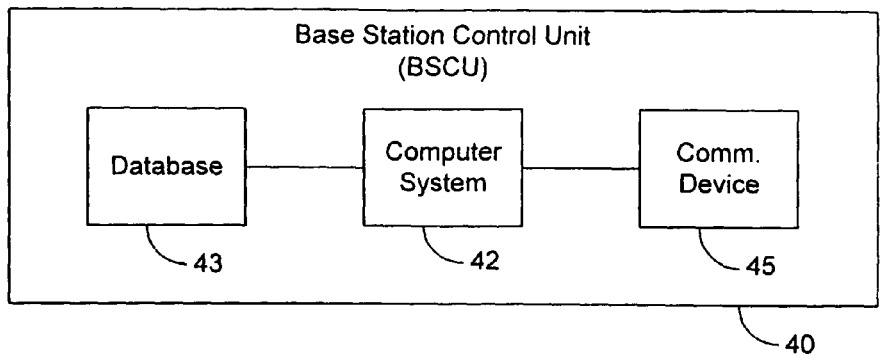
FIG. 4 is a block diagram illustrating an implementation of a base station control unit depicted in FIG. 1.

Referring to FIG. 4, the base station control unit (BSCU) 40 preferably comprises a computer system 42 interfaced with a database 43 and a communications device 45. The communications device 45 may be a computer system separate to system 42 or may be a component (e.g., peripheral device) of the computer system 42. A suitable communications device 45 is described in U.S. patent application entitled, "Base Station System and Method for Monitoring Travel of Mobile Vehicles and Communicating Notification Messages," Ser. No. 09/516,577, which is incorporated herein by reference. Furthermore, database 43 may be separate from system 24, as shown by FIG. 4, or may be employed by memory within system 42.

Figure 5:
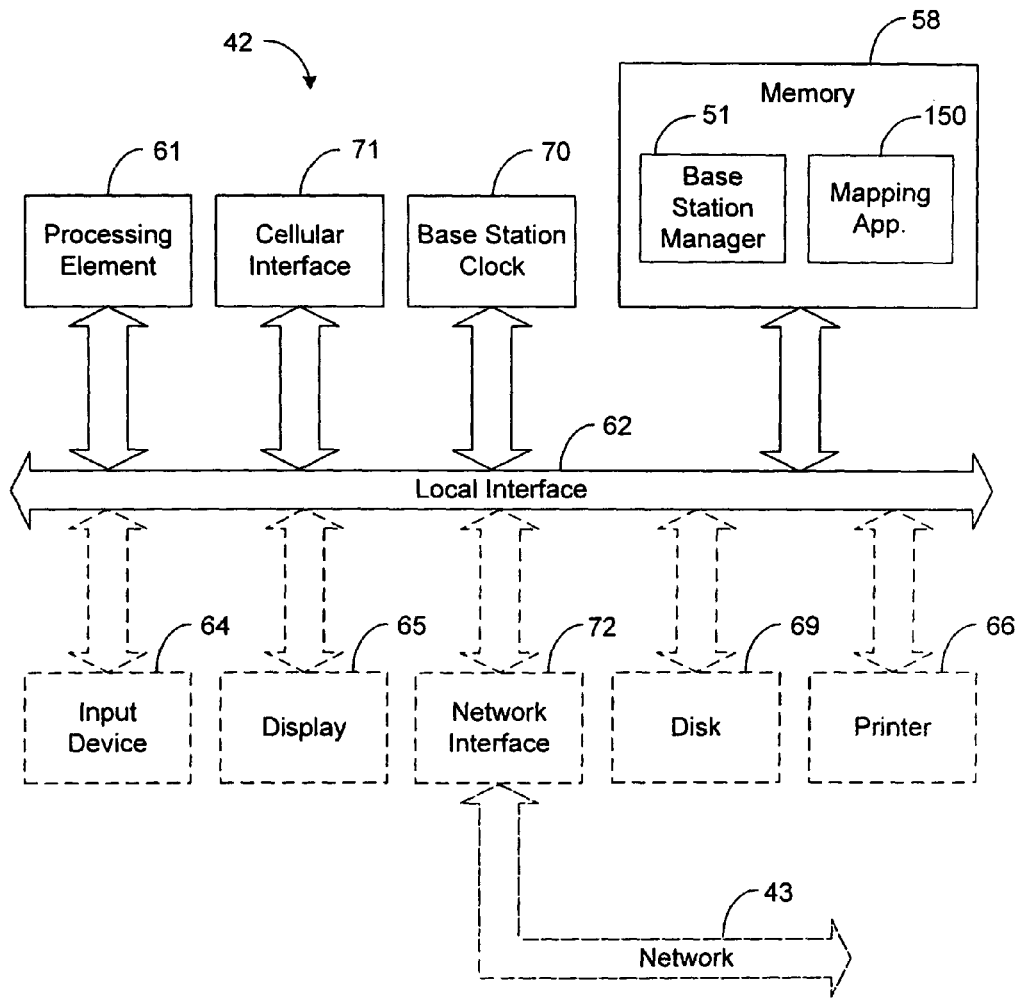
FIG. 5 is a block diagram illustrating a computer system depicted in FIG. 4.

Referring to FIG. 5, the computer system 42 includes a base station manager 51. The base station manager 51 can be implemented in software, hardware, or a combination thereof. In the preferred embodiment, as illustrated by way of example in FIG. 5, the base station manager 51 of the present invention along with its associated methodology is implemented in software and stored in memory 58.

Further shown by FIG. 5, the computer system 42 may include one or more processing elements 61, such as a DSP, that communicate to and drive the other elements within the system 42 via a local interface 62, which may include one or more buses. Furthermore, an input device 64, for example, a keyboard or a mouse, can be used to input data from a user of the system 42, and screen display 65 or a printer 66 can be used to output data to the user. A disk storage mechanism 69 can be connected to the local interface 62 to transfer data to and from a nonvolatile disk (e.g., magnetic, optical, etc.). Furthermore, a base station clock 70 may be connected to the computer system 42 so that components of the system 42 may utilize data from the clock 70 to determine time through conventional techniques. The system 42 may also be connected to a cellular interface 71, or other type of suitable interface, for communicating with VCU 15. It may also be desirable for computer system 42 to include a network interface 72 that allows the system 42 to exchange data with a network 73. It should be noted that input device 64, display 65, printer 66, disk 69, network interface 72, and network 73 are optional and are not necessarily a part of the preferred embodiment.

The database 43 shown by FIG. 4 preferably stores data defining the route schedule of one or more vehicles 17. For example, the database 43 may include entries that are correlated with a vehicle 17 of the system 10 (FIG. 1), wherein each entry includes sufficient data to define a checkpoint that may be used to monitor the travel of the vehicle 17. The checkpoints defined in the database 43 for a particular vehicle 17 are preferably the same checkpoints defined in vehicle tracking information 39 (FIG. 3) for the particular vehicle 17. Furthermore, the entry may also include data to indicate the time of day that the vehicle 17 is expected to reach the checkpoint defined by the entry. Therefore, the database 43 includes sufficient data to define the checkpoints used to monitor the vehicles 17 associated with the system 10 and the times that the vehicles 17 should respectively pass the checkpoints.

The database 43 of the preferred embodiment also includes data indicating when different users are to be notified of an impending arrival of at least one of the vehicles 17 associated with the system 10. For example, the database 43 may include data indicating that a user should be notified a certain amount of time before or after a particular vehicle 17 passes a particular checkpoint. Therefore, at any time, the database 43 can be queried to determine which checkpoints are to be passed by a particular vehicle 17 and when the particular vehicle 17 is expected to pass each of the checkpoints. The database 43 also can be queried to determine when users are to be notified of an impending arrival of a particular vehicle. To facilitate querying of the database 43, the entries of the database 43 may be keyed by vehicle numbers used to identify the vehicles associated with the system 10.

To illustrate the configuration and use of the database 43, assume that a user would like to be notified when a particular vehicle 17 is two minutes from a particular location, such as the user's house or a scheduled vehicle stop. Assume further that the vehicle 17 is scheduled to pass a checkpoint every five minutes after starting its route and that the particular location is expected to be reached seventeen minutes after the vehicle 17 starts its route. In this scenario, the database 43 should include data that defines each of the checkpoints along the vehicle's route and that indicates the time that the vehicle 17 is expected to pass each of the checkpoints. The database 43 should also indicate that the individual is to be notified when the vehicle 17 passes the third checkpoint, since the vehicle 17 is expected to pass the third checkpoint fifteen minutes into the route (i.e., two minutes before the vehicle 17 is expected to reach the particular location).

In the preferred embodiment, the database 43 also includes sufficient information to enable the individual to be automatically notified once a determination is made that the user should be notified. For example, the database 43 may include the individual's telephone number, pager number, e-mail address, or other type of contact information, depending on the methodology used to notify the individual.

As shown by FIG. 6, the base station manager 51 preferably includes a route handler 72 and a schedule monitor 76. The schedule monitor 76 will be discussed in further detail hereinafter. The route handler 72 is configured to query the database 43 to build a list of notification events that are expected to occur during a specified time period. A "notification event" is the generation of a notification message to be transmitted to a user to notify the user of an impending arrival of a vehicle 17 associated with the system 10. For example, the route handler 72 may query the database 43 at the beginning of a day to determine each notification event that should occur during the course of the day, and the route handler 72 then builds a list of these events. The list should not only indicate what notification events are to occur but also should indicate at what time each notification event is expected to occur. The list may also include contact information (e.g., telephone numbers, pager numbers, e-mail addresses etc.) to facilitate the process of contacting the users associated with the notification events in the list.

FIG. 7 shows an exemplary list 81 that may be produced by the route handler 72. The list 81 depicts four entries, although any number of entries may be included in the list 81. Each entry of the list 81 is associated with a respective notification event and indicates: (1) the time at which the respective notification event is expected to occur, (2) the contact information (e.g., telephone number, pager number, e-mail address etc.) associated with the particular user, and (3) a vehicle number identifying the particular vehicle 17 associated with the notification event. For example, assume that "entry 1" is associated with a notification event for a user that would like to be notified when a particular vehicle (vehicle number "1112") is five minutes from a particular location. Based on the information stored in database 43, assume that the route handler 72 determines that the notification event should occur at 6:30 a.m. (five minutes before the particular vehicle 17 is scheduled to arrive at the particular location). As a result, "entry 1" of the list 81 indicates that the notification event associated with the entry is to occur at 6:30 a.m. "Entry 1" also provides the user's contact information and the vehicle number ("1112") of the vehicle 17 that is to arrive at the particular location. Each of the other entries can be similarly configured based on the information associated with the notification events indicated by the other entries. Once the route handler 72 has defined the list 81, the route handler 72 transmits the list 81 to schedule monitor 76.

When the BSCU 40 receives a status message from one of the VCUs 15 indicating that one of the vehicles 17 is early or late, the route handler 72 transmits an update request based on the received status message. In response to the update request, the schedule monitor 76 is designed to update the list 81, if the list 81 includes an entry associated with a notification event pertaining to the one vehicle 17.

For example, assume that the route handler 72 receives a status message indicating that the vehicle 17 associated with "entry 1" (i.e., vehicle number "1112") is seven minutes late. In response, the route handler 72 transmits an update request to schedule monitor 76. The update request preferably includes information indicating which vehicle 17 is off schedule and how much the vehicle 17 is off schedule. Based on this update request, the schedule monitor 76 determines that the vehicle 17 associated with the update request (i.e., vehicle number "1112") is seven minutes late. The schedule monitor 76 is designed to traverse the list 81 to identify each entry associated with the vehicle number "1112" and is configured to increase the time values stored in the identified entries by seven minutes to account for the tardiness of vehicle number "1112." Therefore, in the list 81 depicted by FIG. 7, the schedule monitor 76 changes the time value in "entry 1" from "6:30" to "6:37." As a result, the notification event associated with "entry 1" should not occur until 6:37 a.m.

Upon receiving a status message, the route handler 72 is also designed to update the database 43. Therefore, in the example described hereinbefore, the route handler 72 is designed to input data into the database 43 indicating that vehicle number "1112" is seven minutes late. As a result, the database 43 can be consulted at any time to determine not only the scheduled route of any vehicle 17 but also to determine the status of the vehicle 17 as the vehicle 17 is traveling its route. In this regard, if the database 43 does not indicate that a particular vehicle 17 is early or late, then it can be assumed that the vehicle 17 should arrive at its future checkpoints on schedule. However, if the database 43 indicates that the vehicle 17 is early or late, then it can be assumed that the vehicle 17 will arrive at its future checkpoints off schedule by the amount indicated by the database 43.

The schedule monitor 76 is configured to periodically scan the list 81 to determine if a notification event should occur (i.e., if a notification message should be transmitted to a user). In this regard, when the time of the day, as determined from base station clock 70, corresponds to (e.g., matches) the time indicated by one of the entries in the list 81, the schedule monitor 76 determines that the notification event associated with the corresponding entry should occur. Therefore, to initiate the occurrence of the notification event, the schedule monitor 76 is designed to transmit a notification request to the communications device 45 (FIG. 4), which transmits a notification message in response to the notification request, as will be described in more detail hereinbelow.

Figure 8:
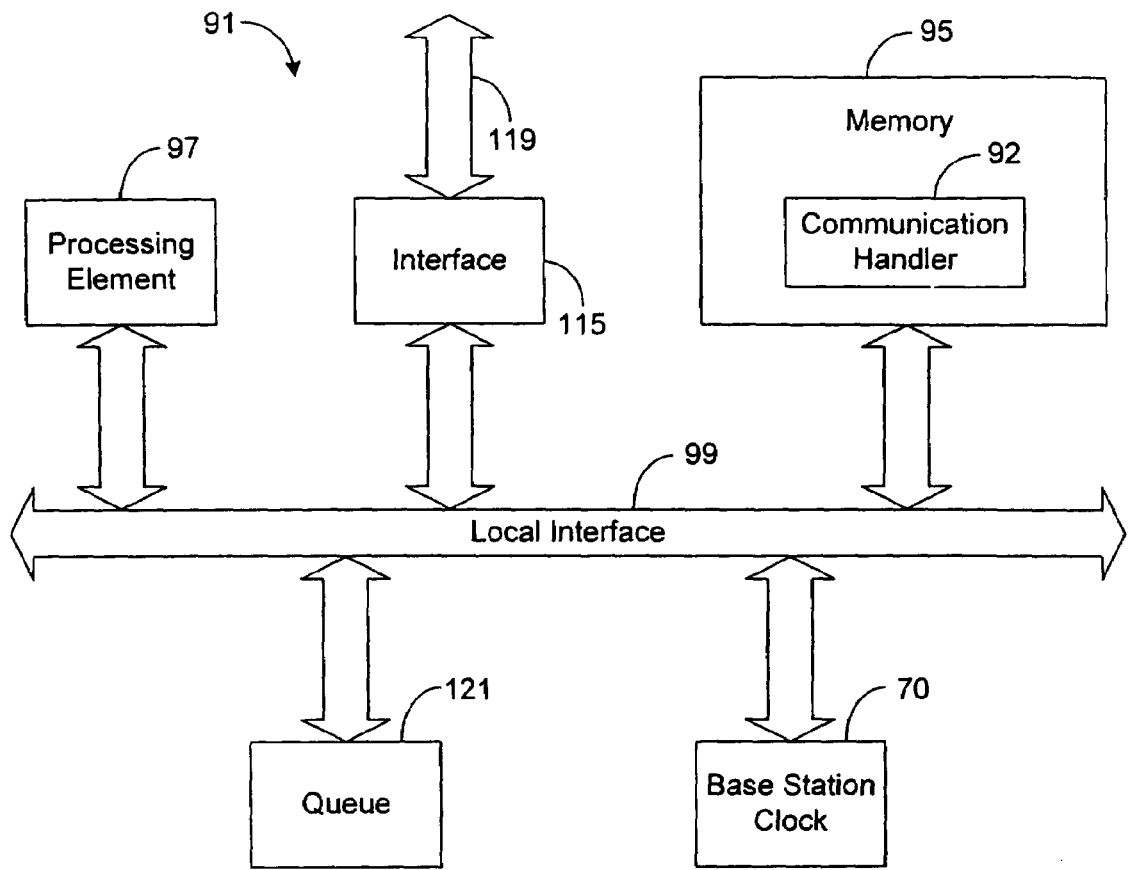
FIG. 8 is a block diagram illustrating a computer system implementing the functionality of the communications device depicted in FIG. 4.

Referring to FIG. 8, a computer system 91 may be employed to implement the communications device 45. The system 91 may include a communication handler 92 to control the operation of the system 91. The communication handler 92 may be implemented in software, hardware, or a combination thereof. In the preferred embodiment, as depicted by FIG. 8, the communication handler 92 is implemented in software and stored in memory 95.

Further shown by FIG. 8, the computer system 92 may include one or more processing elements 97, such as a DSP, that communicate to and drive the other elements within the system 92 via a local interface 99, which may include one or more buses. Furthermore, the base station clock 70 may be connected to the computer system 91 so that components of the system 91 may utilize data from the clock 70 to determine time through conventional techniques. The computer system 91 of the preferred embodiment also includes an interface 115, such as a telephone interface, for example, coupled to a plurality of communication connections 119 that enables the communication handler 92 to transmit the notification messages across the connections 119. As an example, the interface 115 may be coupled to a T1 trunk or a plurality of T1 trunks that, as known in the art, are capable of placing up to twenty-four telephone calls each. Various devices may be employed to implement the interface 115 depending on the type of communication used to transmit the notification messages. For example, the interface 115 may be a telephone interface, a cellular interface, a modem, or other type of device or devices for communicating notification messages.

Figure 9:
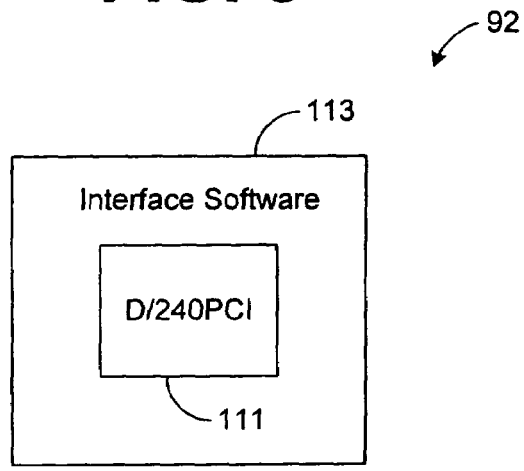
FIG. 9 is a block diagram illustrating a more detailed view of a communication handler depicted in FIG. 8.

The communication handler 92 is preferably capable of processing multiple notification requests and of simultaneously communicating multiple notification messages to users to warn the users of impending arrivals of vehicles 17. For example, in one embodiment, the communication handler 92 is implemented by a D/240PCI card 111 manufactured by Dialogic Corp., as shown by FIG. 9. Other software 113 may be implemented to interface the notification messages with the Dialogic card. This other software 113 may include Visual Voice software, which is a well known set of software commonly used to interface data with the Dialogic card 111. Furthermore, in other embodiments, the communication handler 92 may be configured to transmit notification messages one at a time, if desired.

As shown by FIG. 1, the notification messages may be routed to one or more users via a communication network, such as the publicly switched telephone network (PSTN) 123. In this regard, the network 123 routes each notification message transmitted by communication handler 92 to a communication device 124, such as a telephone, for example, at a premises 126 of a user that is to receive the notification message. Upon receiving the notification message from network 123, the communication device 124 communicates the notification message to the user. It should be noted that it is not necessary for notification messages to be communicated via telephone calls and that the communication device 124 may be any device capable of communicating a notification message. For example, the communication device 124 may be pager in one embodiment. In another embodiment, the communication handler 92 transmits a notification message to the device 124 via the Internet. For example, the communication handler 92 may transmit an e-mail message to the device 124, which in this example is a computer capable of reading the message and displaying the message to the user.

If the communication handler 92 cannot immediately transmit a notification message in response to a notification request, then the communication handler 92 is designed to store the notification request into a queue 121 (FIG. 8). The communication handler 92 then services the notification requests stored in the queue 121 on a first in, first out (FIFO) basis. Therefore, the communication handler 92 services the notification requests in the order in which they were received by the communication handler 92.

As stated hereinbefore, each notification request is generated in response to a determination that a user should be warned of an impending arrival of a particular vehicle 17 at a particular location. Therefore, each notification request preferably includes contact information to enable the communication handler 92 to send a notification message to the particular user associated with the notification request or includes other information to enable the communication handler 92 to retrieve such contact information from the database 43. As a result, the communication handler 92 is configured to utilize contact information included in the notification request or stored in the database 43 to automatically transmit a notification request to the user associated with the notification request.

It should be noted that the list 81 is not a necessary feature of the present invention. In this regard, the database 43 can be repeatedly searched to determine when to generate notification requests (i.e., where a notification event should occur). However, repeatedly searching the database 43 could result in the unnecessary processing of a vast amount of data, depending on the amount of data and entries stored in database 43. Utilization of the list 81 enables a much smaller amount of data to be searched in identifying whether notification requests should be generated during a particular time interval.

Furthermore, it is possible for the functionality of the VCU 15 and the BSCU 40 to be divided differently. In this regard, it is possible for some of the functionality performed by the BSCU 40 to be performed by the VCU 15 instead and for some of the functionality of the VCU 15 to be performed by the BSCU 40 instead. For example, it is possible to periodically transmit the location values from the sensor 18 to the BSCU 40. The BSCU 40 may then determine whether the vehicle 17 is on or off schedule based on these location values rather than the status messages transmitted by the VCU 15 in the preferred embodiment. Furthermore, it is possible for the BSCU 40 to be eliminated by having the VCU transmit notification messages directly to the users, similar to the techniques described in U.S. Pat. No. 5,444,444, which is incorporated herein by reference. It is further possible to utilize various other techniques for tracking vehicles and/or notifying users of impending arrivals, such as the techniques described in U.S. Pat. No. 5,400,020.

However, in any embodiment, at least one vehicle schedule, such as the schedule defined by vehicle tracking information 39, should be provided that includes the location values that should be compared with the values produced by the sensor 18 in determining when notification messages should be transmitted to users. These location values in the vehicle schedule may be the values indicating the vehicle stops that the vehicle 17 is expected to make and/or may be the values indicating checkpoints along the vehicle's route. Alternatively, the location values may indicate other reference locations in other embodiments.

As described in the Background section, obtaining and maintaining the foregoing location values for a vehicle schedule may be difficult and burdensome, especially when the advance notification system 12 is utilized to service a large number of vehicles 17 and/or users.

Obtaining Vehicle Schedule Information

There are various methodologies that may be employed to obtain the data defining the vehicle schedule that is used to monitor the travel of a vehicle. U.S. patent application having Ser. No. 09/395,501 and entitled "BASE STATION APPARATUS AND METHOD FOR MONITORING TRAVEL OF A MOBILE VEHICLE," which is incorporated herein by reference, describes a process of obtaining the vehicle schedule information during an initial traversal of the route. In this regard, the vehicle 17 drives the route and the location values from the sensor 18 are stored in the VCU 15 and/or the BSCU 40 when the vehicle 17 is at each vehicle stop point and/or other checkpoint that is to be used to monitor the vehicle 17. Therefore, upon completing the route, the VCU 15 and/or the BSCU 40 should contain sufficient data for monitoring the vehicle 17 the next time the vehicle 17 drives the same route.

In another embodiment, an operator may enter into the system 10 the data that is to be used to monitor the vehicle 17. For example, the operator may obtain the coordinate values of each checkpoint that is to be used to monitor the vehicle and may enter these values into the BSCU 40 via input device 64.

However, entering the coordinate values, or other types of location values, into the system 10 can be tedious and burdensome. Furthermore, in applications where the route frequently changes, the foregoing methodologies may be impractical since the coordinate values for each new route would need to be entered into the system 12. Therefore, a mapping application 150 (FIG. 5) is preferably used to facilitate the process of entering the route data into the system 10. The mapping application 150 may be implemented in hardware, software, or a combination thereof. As shown by FIG. 5, the mapping application 150 may be implemented in software and stored within memory 58 of the BSCU 40 or other computer-readable medium.

The mapping application 150 maybe configured similar to conventional mapping software programs that receive an address and produce a display of a map showing directions to the address. Most conventional mapping software programs convert the input data (e.g., the input address) into geographical coordinate values before further processing the input data. The mapping application 150 of the present invention similarly converts input data into coordinate values, which can then be automatically stored in an entry of the database 43 or the vehicle tracking information 39. Therefore, an operator can input the addresses or other location information that define the vehicle stop points and/or other checkpoints of the vehicle's route, and the mapping application 150 automatically converts this information into coordinate values, which can then be provided to and used by the system 10 to monitor the travel of the vehicle 17.

For example, a user may enter data that identifies a location where a delivery or a pickup is to take place. This data is translated into a set of coordinate values by the mapping application, and these coordinate values are then used to define at least one checkpoint and/or to indicate when at least one notification message should be transmitted. For example, based on the foregoing coordinate values, a checkpoint and/or other data may be defined such that a notification message is transmitted when a particular vehicle 17 reaches the checkpoint.

Delivery services have conventionally stored in a database, such as database 43, the address or other location information of where items are to be delivered and/or picked up. The base station manager 51, or some other control mechanism, can be configured to transmit the stored addresses to mapping application 150, which automatically converts or translates the addresses into coordinate values and provides the coordinate values to the base station manager 51. These coordinate values can then be used by the base station manager 51 to define the vehicle's checkpoints that are used to monitor the vehicle 17 and/or to indicate when a notification message should be transmitted, as described above. Therefore, the current computer systems utilized by many delivery services for tracking items can be easily modified to implement the vehicle tracking system 10 of the present invention.

Furthermore, the mapping application 150 may be configured to display a map having symbols representing various locations. The map may be displayed locally at the premises of the BSCU 40 via display 65 or may be displayed remotely by transmitting mapping data to a remote device, such as a computer at user's premises 126 via the Internet or other data communications network. A user may then select one of the displayed locations by utilizing a mouse to click on the symbol representing the location or by identifying the location via other suitable techniques (e.g., entering inputs via a keyboard). The mapping application 150 may be configured to provide the coordinate values of the selected location to the base station manager 51. These coordinate values may then be transmitted to database 43 by the base station manager 51 and used to define at least one checkpoint for a vehicle 17 and/or to indicate when at least one notification message should be transmitted, as described above. Therefore, the mapping application 150 may enable users to efficiently and easily provide the system 10 with data that defines vehicle schedule information.

Note that the data defining the checkpoints and/or other vehicle schedule information may be transmitted to the VCU 15 by the BSCU 40. This data may then be used to define the vehicle tracking information 39 (FIG. 3). Furthermore, the foregoing data and/or information based on the foregoing data may also be displayed to the driver of the vehicle 17 so that the driver is aware of the route that is to be driven.

The mapping application 150 may be configured to perform additional functionality for further simplifying the process of obtaining and managing the data used to monitor the vehicles 17 associated with the system 10. In this regard, when a large number of items are to be delivered or picked up by a large number of vehicles 17 at various locations, it can be difficult to define routes for each of the vehicles 17 so that the items can be efficiently distributed among the vehicles 17. Therefore, conventional software programs, such as MapNet developed by Ecotran, have been developed that efficiently and automatically define routes for transporting items and that assign each of the items to a particular route. The routes are created based on locations of the vehicle stops. For example, in utilizing MapNet for a bus service, data identifying each passenger and the location where each passenger is to be delivered or picked-up is entered. Based on this information, the MapNet defines a route for each bus and assigns each passenger to the bus that is scheduled to stop at the delivery or pick-up point associated with the passenger. The MapNet is configured to efficiently define the routes such that the total number of buses and the delays associated with delivering or picking up the passengers are minimized.

In performing the above-described functionality, MapNet utilizes coordinate values, similar to the coordinate values produced by the sensor 18 in the preferred embodiment. In this regard, MapNet converts the input data identifying each bus stop location into coordinate values. Furthermore, to select and define the routes, MapNet includes coordinate values of the streets that may be used to transport the passengers. To select the optimal routes, MapNet defines different sets of routes for the buses, and determines how many buses would be required to transport the items and how far each bus must travel for each set of routes. The set of routes that provides optimal performance in terms of the number of buses required and the distance and/or delay associated with driving the routes is selected by MapNet. MapNet then outputs data indicating the selected routes. This data is usually in a form easily readable by a user. For example, instead of outputting the coordinate values of a route, MapNet outputs the street name or names that define the route and provides directions in terms of street names. For example, the output data may indicate that a bus, in driving the selected route for the bus, should turn onto Johnson Street, proceed to $5^{th}$ Avenue, turn left on $5^{th}$ Avenue, etc.

By modifying the MapNet software such that MapNet outputs coordinate values, MapNet may be used to implement the mapping application 150. In this regard, the mapping application 150 may be configured to receive, as input, data identifying each item to be transported and the location where the item is to be delivered or picked-up. Like MapNet, the mapping application 150 can then be configured to select an optimal set of routes for delivering and/or picking up the items based on the data received by the mapping application 150. The mapping application 150 then may output via display 65 or printer 66 data defining the routes and data indicating which items are assigned to which vehicle 17 or route. Furthermore, the mapping application 150 is preferably configured to store in database 43 the coordinate values defining the vehicle checkpoints used by the system 10 to monitor the vehicles 17. Therefore, once the data identifying each item to be transported and the location where the item is to be delivered or picked up is input into the system 10, the system 10 is configured to generate the necessary data for defining the routes that are to be used in delivering and/or picking up the items and for monitoring the vehicles 17 as the vehicles 17 travel the routes.

By utilizing the aforementioned techniques it is possible to efficiently obtain and maintain vehicle schedule information that can then be used to monitor the status of vehicle 17 and to transmit notification messages for notifying users of impending arrivals of the vehicles 17. It should be noted, however, that there are various methodologies for determining when notification events should occur, and the present invention should not be limited to the particular embodiment or embodiments disclosed herein. In this regard any method of scheduling notification events and for determining when notification events should occur may be implemented without departing from the principles of the present invention.

It should be noted that the present invention has been described herein as tracking vehicles 17 and determining when to generate a notification message to a user based on time values. However, other types of values may be used to monitor the travel of the vehicle 17. For example, a notification message could be generated when a particular vehicle comes within a certain distance of a particular location. U.S. patent application entitled, "Base Station Apparatus and Method for Monitoring Travel of a Mobile Vehicle," assigned Ser. No. 09/395,501, and filed on Sep. 14, 1999, which is incorporated herein be reference, describes how distance values may be used to determine when to transmit notification messages.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

Now, therefore the following is claimed:

1. A system for tracking vehicles, comprising:
    means for receiving data identifying a particular location from a user interface device;
    means for automatically translating said received data received into a set of location values;
    means for storing said set of location values;
    means for monitoring travel data associated with a vehicle based upon location values produced by a location sensor that senses vehicle location;
    means for comparing said set of said location values produced by said location sensor to said set of stored location values;
    means for determining when said vehicle is within a predefined proximity of said particular location; and
    means for causing a notification communication to be transmitted to a user communications device in response to a determination that said vehicle is within said predefined proximity of said particular location.

2. The system of claim 1, further comprising means for causing display of a map on said user interface device including symbols representing various locations, said particular location associated with one of the symbols.

3. The system of claim 2, further comprising means for transmitting data defining said map across the Internet to said user interface.

4. The system of claim 2, further comprising:
    means for selecting said symbol associated with said particular location; and
    means for transmitting said data identifying said particular location.

5. A system for tracking vehicles, comprising:
    means for receiving data identifying a plurality of locations;
    means for automatically defining a plurality of routes based on said data identifying a plurality of locations;
    means for associating each of said plurality of locations with one of said routes;
    means for automatically translating said data identifying said plurality of locations into location values;
    means for storing a set of said location values, said set of location values identifying a particular location;
    means for monitoring travel of a vehicle based on location values produced by a location sensor that senses vehicle location;
    means for comparing said set of said location values produced by said location sensor to said set of stored location values;
    means for determining when said vehicle is within a predefined proximity of said particular location; and
    means for causing a notification message to be transmitted to a user communications device in response to a determination in said determining step that said vehicle is within said predefined proximity of said particular location.

6. The system of claim 5, further comprising: means for displaying a map including at least one symbol, said one symbol representing said location; and
    means for enabling a user to select said one symbol,
    wherein said received data includes data transmitted in response to a user selection of said one symbol.

7. A method for tracking vehicles, comprising:
    receiving data identifying a particular location from a user interface device;
    translating said received data received into a set of location values;
    storing said set of location values;
    monitoring travel data associated with a vehicle based upon location values produced by a location sensor;
    comparing said set of said location values produced by said location sensor to said set of stored location values;
    determining when said vehicle is within a predefined proximity of said particular location; and
    causing a notification communication to be transmitted to a communications device in response to a determination that said vehicle is within said predefined proximity of said particular location.

8. The method of claim 7, further comprising the step of providing a map to the user interface device over the Internet.

9. The method of claim 7, further comprising the step of commencing the causing step when the vehicle has reached or is in a predefined proximity of the identified one or more locations or one or more regions.

10. The method of claim 9, wherein the predefined proximity is based upon a location, distance, or time information.

11. The method of claim 7, further comprising the step of using a notification computer system on the vehicle to perform the causing step.

12. The method of claim 7, further comprising the step of using a notification computer system at a location that is remote from the vehicle and the user communications device to perform the causing step.

13. The method of claim 7, further comprising the step of providing a map to the user communications device during the notification communication and indicating on the map a location of the vehicle.

14. The method of claim 7, further comprising the step of enabling of a location where a delivery or pickup is to take place.

15. The method of claim 7, further comprising the step of generating the travel data based upon checkpoint locations to be traversed by the vehicle.

16. The method of claim 7, further comprising the step of providing a message during the notification communication, the message indicative of the travel status of the vehicle.

17. A notification computer system that implements the steps of claim 7.

18. The method of claim 7 wherein the user communications device is a computer, television, pager or telephone.

19. The method of claim 7, wherein the notification communication is an email.

20. The method of claim 7, wherein the vehicle is a plane, train, boat, or motor vehicle.

* * * * *